July 16, 1963  J. BRIDEAU  3,097,891
TOOL GUIDE
Filed Jan. 10, 1961
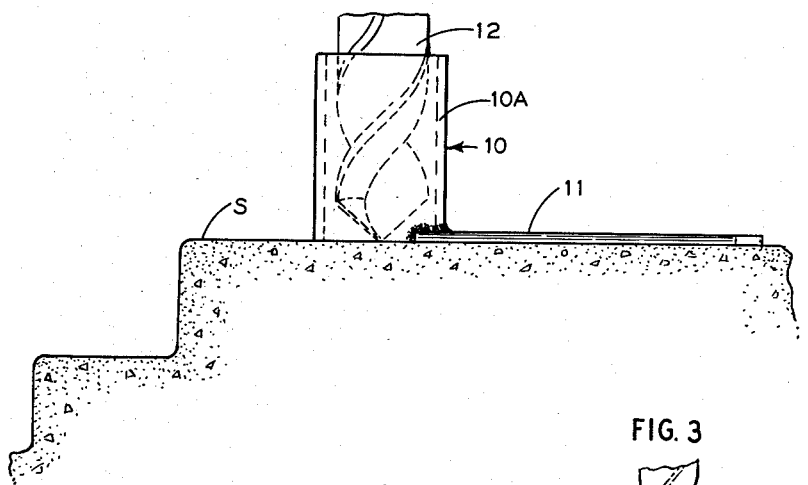
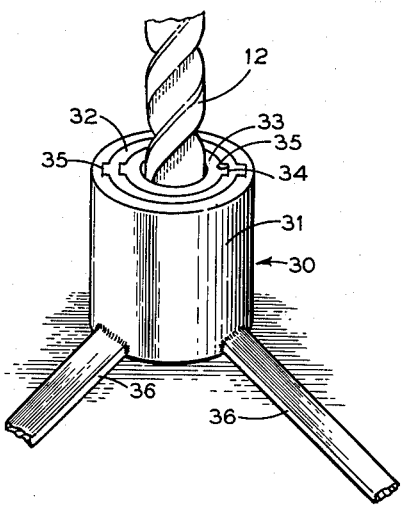
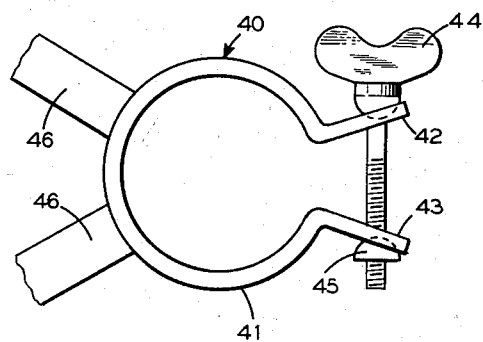
INVENTOR.
James Brideau
BY Arthur F. Fattibene
ATTORNEY

3,097,891
TOOL GUIDE
James Brideau, 4141 Madison Ave., Trumbull, Conn.
Filed Jan. 10, 1961, Ser. No. 81,771
1 Claim. (Cl. 308—4)

This invention relates to a tool guide, and more specifically, to a guide for accurately positioning a drill bit in a given spot and maintaining the position thereof during a drill operation.

Heretofore, much difficulty has been encountered in initiating a drilled hole when drilling through a very hard surface, e.g. concrete, stone, and the like. In drilling out a given spot in a hard surface, the rotation of the drill causes the drill bit to "walk" over a considerable area before the actual hole is started an amount sufficient to guide and hold the bit in place. Consequently, more often than not, the opening or entrance of the drilled hole is enlarged, and the hole is not formed with a straight smooth, uniform bore. Also extreme accuracy in spotting a drill hole cannot be attained if the drill bit is permitted to "walk" in initiating a drilled hole.

Therefore, an object of this invention is to overcome the afore-mentioned difficulties and to provide a relative simple guide for positively preventing any "walking" of a drill bit when drilling in a hard surface.

Another object is to provide a guide for a drill bit that is relatively simple in construction, easy to use, positive in operation, and readily adaptable to accommodate various sized drill bits.

Other features and advantages will become readily apparent when considered in view of the drawings and description thereof in which:

FIG. 1 is a side elevation view of the drill guide of this invention illustrating its application in initiating a drilled hole in concrete steps.

FIG. 2 is a plan view of the drill guide of FIG. 1, but modified to illustrate another embodiment thereof.

FIG. 3 is a perspective view of still another modified embodiment of the invention.

FIG. 4 is a plan view of still another modified form of the invention.

Referring to the drawings, FIG. 1 illustrates a typical embodiment of the drill guide 10 in accordance with this invention. In drilling through hard surfaces S such as concrete to form a hole, as for example, to receive the post of an iron railing and the like, difficulty was encountered positioning and maintaining a drill bit 12 in a given spot. To enhance the quality and accuracy of a hole drilled in concrete, this invention contemplates a novel guide 10 to accurately position a drill bit 12 at a given spot. As shown, the guide 10 comprises a sleeve 10A which is adapted to circumscribe the exact spot in which it is desired that the hole be drilled. Connected to the lower end of the sleeve, e.g. by welding, are a pair of foot bars 11 which extend radially outwardly, as for example as shown in FIG. 3. Thus, it will be noted that with the sleeve 10A in position over the spot to be drilled, the operator places his weight on the guide 10 by stepping on each of the radial foot bars 11. With the guide thus positively anchored in position, the drilling operation can be commenced by inserting the drill bit 12 into the sleeve. Thus the bit 12 is guided so as to resist the tendency of the drill bit to "walk" over a considerable area before a hole of sufficient depth is had to maintain the drill bit 12 in the desired spot. With the relatively simply constructed guide, a finer and more accurately placed hole can be drilled.

The drill bit guide 20 of FIG. 2 comprises a sleeve 21, as described, but modified by the inclusion of a pair of readily removable foot bars 22. As shown, the foot bars 22 are formed with a threaded end 22A which are adapted to be screwed into a threaded boss 22B formed integral with sleeve 21. Thus, in this form, the foot bars 22 can be readily detached to render the device compact so that it may be carried in conventional tool boxes.

The modified guide 30 illustrates an embodiment which is adapted to be adjusted to any of a number of different size drill bits. As shown, the guide comprises an outer sleeve 31 and a plurality of concentrically disposed inner sleeves 32, 33. While only two such inner sleeves are illustrated, it will be understood that more or less of such sleeves may be provided. Each sleeve is sized to receive a particular sized drill bit, e.g. ¼", ½", ¾", etc. Thus the guide can be adjusted to any drill bit simply by removing the smaller size sleeves from the guide. To maintain the sleeves 31–33 in position relative to each other, cooperating interlocking means are provided. For example each sleeve may be provided with a longitudinally extending key 34 on its outer surface adapted to receive in a keyway 35 on the inner surface of the next adjacent sleeve. A pair of foot bars 36 are welded to the outer sleeve 31, as hereinbefore described.

FIG. 4 illustrates a further adjustable embodiment. In this form guide 40 comprises a split sleeve 41 having opposed spaced flanges 42, 43 adjacent the ends thereof. The split sleeve is preferably formed of a readily spring or flexible type material. The arrangement is such that the diameter of the sleeve can be readily varied to the size of a particular drill bit within a given range by means of an adjusting thumb screw 44 and cooperating nut 45. Thus depending on the rotation of the thumb screw the diameter of the sleeve 41 can be adjusted to the size of the drill bit to be employed. Foot bars 46 are provided as hereinbefore described.

While the instant invention has been disclosed with reference to a particular embodiment thereof, it is to be appreciated that the invention is not to be taken as limited to all of the details thereof as modifications and variations thereof may be made without departing from the spirit or scope of the invention.

What is claimed is:

A heavy duty variable diameter guide accommodating any of several heavy duty drill bits of different sizes falling within a given range of sizes to accurately position any of said drill bits within said range of sizes at a given spot, said guide comprising (a) an outermost guide sleeve, (b) an innermost guide sleeve, and (c) at least one intermediate guide sleeve, (d) each of said guide sleeves being concentrically nested one within the other so that the top and bottom thereof are substantially flush, (e) and each of said concentrically nested sleeves being sized to receive a different size drill bit falling within said given range of sizes, (f) cooperating means disposed on adjacent concentrically disposed sleeves for maintaining one of said sleeves fixed relative to its adjacent sleeve, (g) said cooperating means including a longitudinally extending key projecting radially outwardly along the outer surfaces of the respective innermost and intermediate sleeves, (h) and an aligned keyway extending longitudinally along the inner surfaces of outermost and said intermediate sleeves respectively so that in the nested position of said sleeves the key along the outer surface of one sleeve is received within the cooperating aligned keyway of the next adjacent sleeve whereby said cooperating key and keyway of adjacent sleeves prohibit relative movement between the respective sleeves during a drilling operation, (i) each of said sleeves per se forming the guide for its respectively sized drill bit,
(j) and foot bars connected to the outermost sleeve,
(k) said foot bars extending radially outwardly from said outer sleeve upon which an operator may stand to hold the guide in place, whereby the size of said guide is varied merely by subtracting one or more of the nested sleeves smaller than the drill size to be used.

References Cited in the file of this patent

UNITED STATES PATENTS

| | | |
|---|---|---|
| 479,499 | Githens | July 26, 1892 |
| 889,273 | Thomas | June 2, 1908 |
| 2,383,953 | Beard | Sept. 4, 1945 |
| 2,490,648 | Ohl | Dec. 6, 1949 |
| 2,490,718 | Stellin | Dec. 6, 1949 |
| 2,877,672 | Roberts | Mar. 17, 1959 |